United States Patent [19]
Eichler et al.

[11] 3,949,551
[45] Apr. 13, 1976

[54] METHOD AND SYSTEM FOR REDUCING NOXIOUS COMPONENTS IN THE EXHAUST EMISSION OF INTERNAL COMBUSTION ENGINE SYSTEMS AND PARTICULARLY DURING THE WARM-UP PHASE OF THE ENGINE

[75] Inventors: Dieter Eichler, Hochberg; Walter Remmele, Stuttgart; Günter Rosenzopf, Ludwigsburg, all of Germany

[73] Assignee: Robert Bosch G.m.b.H., Gerlingen-Schillerhohe, Germany

[22] Filed: Mar. 19, 1974

[21] Appl. No.: 453,015

Related U.S. Application Data
[63] Continuation of Ser. No. 282,848, Aug. 22, 1972, abandoned.

[30] Foreign Application Priority Data
Jan. 29, 1972  Germany............................ 2204292

[52] U.S. Cl. ...................... 60/274; 60/276; 60/284; 60/285; 123/32 EA; 123/119 F; 123/179 L; 123/180 T
[51] Int. Cl.² ......................................... F02B 75/10
[58] Field of Search ............ 60/274, 284, 285, 276; 123/32 EA, 119 F, 179 L, 180 T, 139 AW, 179 G; 261/39 B

[56]  References Cited
UNITED STATES PATENTS

| | | | |
|---|---|---|---|
| 2,905,165 | 9/1959 | Hall .................................. | 123/179 G |
| 2,969,783 | 1/1961 | Braun .............................. | 123/119 F |
| 3,086,353 | 4/1963 | Ridgway ............................... | 60/285 |
| 3,172,251 | 3/1965 | Johnson ............................... | 60/285 |
| 3,483,851 | 12/1969 | Reichardt ........................ | 123/32 EA |
| 3,695,591 | 10/1972 | Caisley ............................ | 123/179 G |
| 3,734,067 | 5/1973 | Glockler .......................... | 123/32 EA |
| 3,738,341 | 6/1973 | Loos ..................................... | 60/285 |
| 3,768,259 | 10/1973 | Carnahan ............................... | 60/285 |
| 3,771,502 | 11/1973 | Reddy ............................ | 123/179 L |

*Primary Examiner*—Douglas Hart
*Attorney, Agent, or Firm*—Flynn & Frishauf

[57]  ABSTRACT

The exhaust system of the engine is provided with a reactor, for example a catalytic reactor; the air-fuel mixture normally fed to the engine is set to be on the lean range. During starting, the mixture is enriched for a predetermined time; the degree of enrichment is then decreased, in dependence on engine, or exhaust system temperature. After the engine, or the reactor has reached operating temperature, the composition of the mixture is controlled by operating parameters of the engine, or sensed exhaust gas composition.

19 Claims, 9 Drawing Figures

METHOD AND SYSTEM FOR REDUCING NOXIOUS COMPONENTS IN THE EXHAUST EMISSION OF INTERNAL COMBUSTION ENGINE SYSTEMS AND PARTICULARLY DURING THE WARM-UP PHASE OF THE ENGINE

CROSS REFERENCE TO RELATED PATENTS AND APPLICATIONS

This is a continuation application of my prior application U.S. Ser. No. 282,848, filed Aug. 22, 1972, now abandoned.

U.S. Pat. No. 3,483,851, REICHARDT, Dec. 16, 1969
U.S. Pat. No. 3,745,768, ZECHNALL et al, July 17, 1973
U.S. Pat. No. 3,874,171, SCHMIDT et al, Apr. 1, 1975
U.S. Pat. No. 3,759,232, WAHL et al, Sept. 18, 1973
U.S. Pat. No. 3,782,347, SCHMIDT et al, Jan. 1, 1974
U.S. Pat. No. 3,815,560, WAHL et al,
U.S. Pat. No. 3,827,237, LINDER et al,
U.S. Pat. No. 3,865,089, EICHLER et al,
U.S. Pat. No. 3,851,469, EICHLER et al,
U.S. Pat. No. 3,832,848, SCHOLL, all assigned to the assignee of the present invention.

The present invention relates to internal combustion engines and more particularly to a method and a system to reduce the noxious components in the exhaust gases thereof, especially during the warm-up period of the internal combustion engine, or of reactors forming part of the exhaust system of the engine.

Reference will be made to an internal combustion engine system; this system is deemed to include not only the cylinders and piston of the engine, but also its fuel supply, the exhaust pipes, reactors, and other components used in, connected to, or controlling the engine as such.

Reference in the specification will be made to the air number, denoted lambda ($\lambda$). This air number $\lambda$ is a measure of the composition of the air-fuel mixture. The number $\lambda$ is proportional to the mass of air and fuel, and the value of this number $\lambda$ is one ($\lambda = 1.0$) if a stoichiometric mixture is present. Under stoichiometric conditions, the mixture has such a composition that, in view of the chemical reactions, all hydrocarbons in the fuel can theoretically combine with the oxygen in the air to provide complete combustion to carbon dioxide and water. For air and gasoline, the ratio, by weight, for $\lambda = 1$ is about 14.4 : 1. In actual practice, even with a stoichiometric mixture, unburned non-combusted hydrocarbons and carbon monoxide are contained in the exhaust gases.

Catalytic reactors connected to the exhaust of internal combustion engines are effective only when they have reached certain operating temperatures. Thus, control of the fuel-air mixture being applied to the engine itself, to reduce noxious exhaust emission, is effective only after the catalytic reactor, or the catalysts therein, have reached a predetermined temperature level. Operation of the internal combustion engine below the operating temperature level of the catalysts, that is, during the warm-up phase of the internal combustion engine and the corresponding warm-up period of the exhaust system, with control of the air-fuel mixture to a value of $\lambda = 1$ is undesirable, since still substantial emission of carbon monoxide, unburned hydrocarbons, and particularly nitrogen oxygen compounds ($NO_x$) will result, all of which components are not reduced, or oxidized, in the reactors connected to the exhaust of the internal combustion engine.

It is an object of the present invention to provide a method, and a system, in which the noxious components of the exhaust gases are reduced also during the warm-up period of the internal combustion engine.

Subject matter of the present invention

Briefly, during the warm-up period of the internal combustion engine and the corresponding warm-up period of the exhaust system thereof, the engine is fed with a relatively lean air-fuel mixture. Immediately upon starting, the mixture may be enriched to facilitate cold starting. The enrichment may persist for a predetermined period of time, e.g. 20–30 seconds; thereafter, during warm-up, the degree of enrichment is reduced in dependence on the temperature of the internal combustion engine (or its exhaust system). This may take, for example, about 2 minutes. When the operating temperature of the engine (or, for example, of the reactor, typically a catalytic reactor in the exhaust system of the engine) has been reached, control over the composition of the air-fuel mixture is transferred to a fuel-air mixture controller responsive to exhaust gas composition to regulate the air number $\lambda$ of the fuel-air mixture being supplied to the engine.

The system, in accordance with a feature of the invention, may include timing means to control the enrichment upon cold starting. Temperature sensitive means control the composition of the mixture after the time period of the timing means has elapsed, and before operating temperature of the engine has been reached. A temperature sensitive switch is utilized which has at least one threshold level in order to connect the air-fuel mixture controller responsive to exhaust gas composition when a certain temperature level within the exhaust system has been sensed, typically within a catalytic reactor connected therein.

The invention will be described by way of example with reference to the accompanying drawings, wherein.

Figure 4:
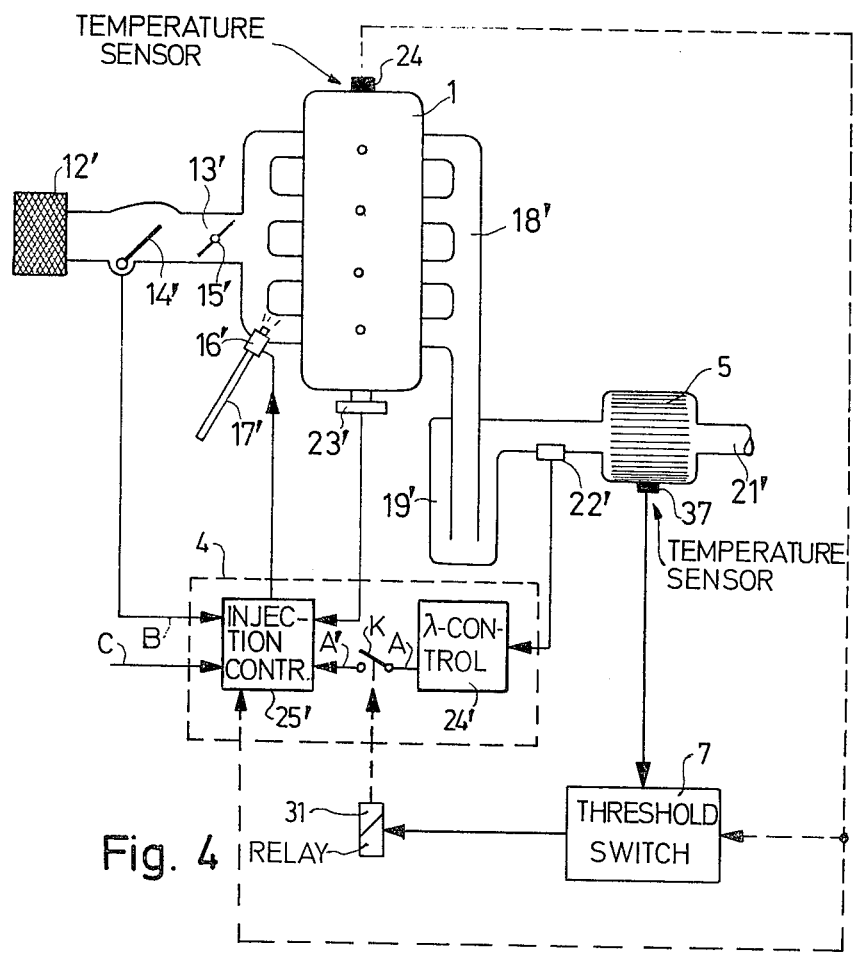
Figure 5:
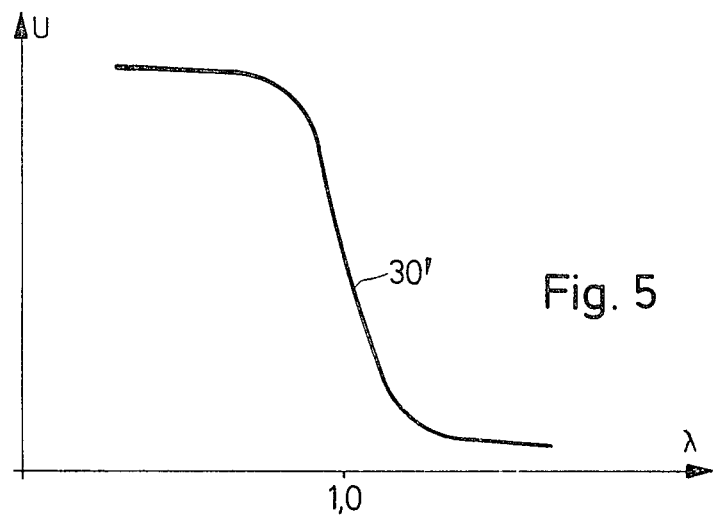
Figure 6:
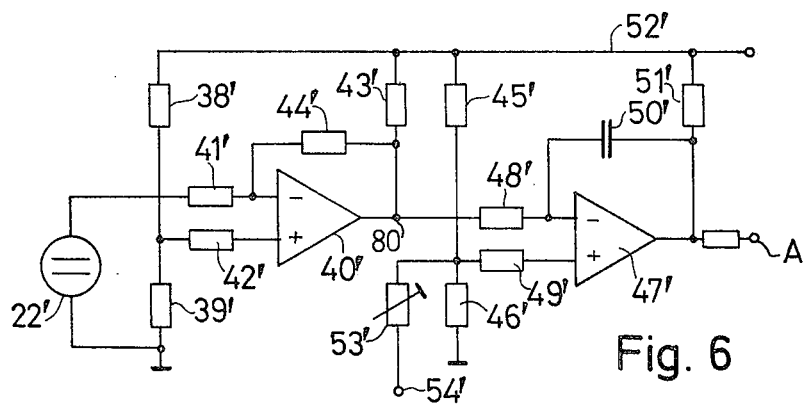
Figure 7:
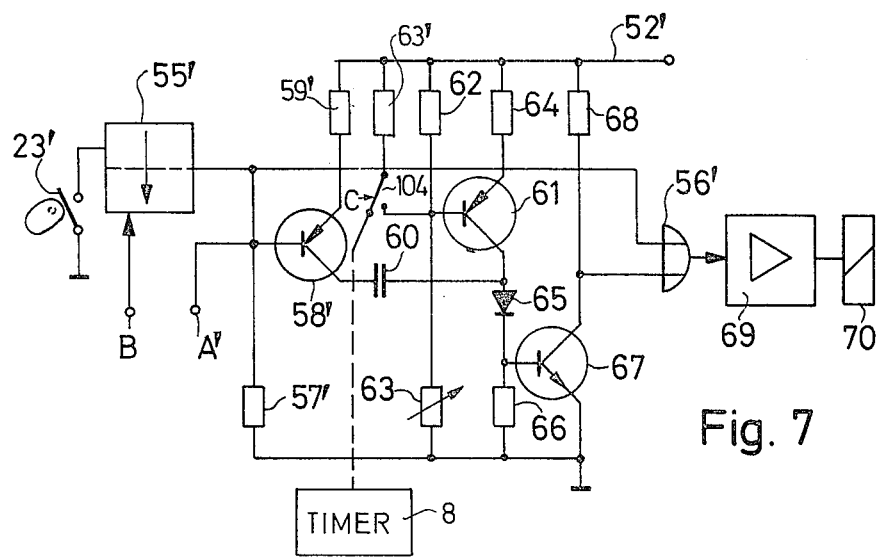
Figure 8:
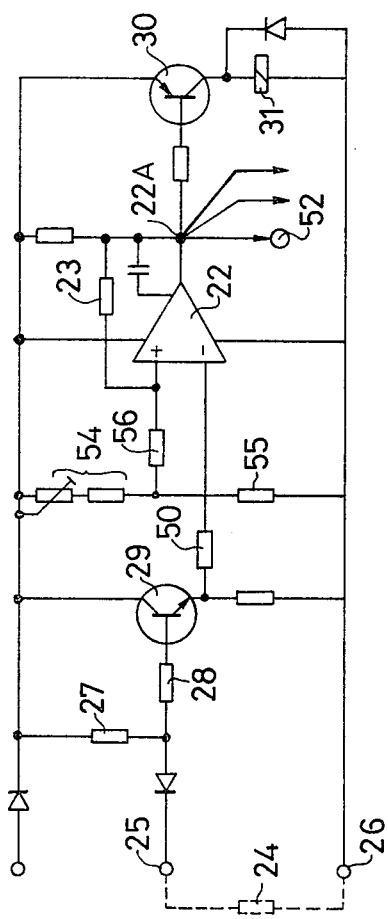

FIG. 4 is a schematic arrangement of an engine system having the system of the present invention applied thereto, and corresponds essentially to cross-referenced U.S. Pat. No. 3,874,171, with the system of the present invention added;

FIG. 5 is an operating characteristic of the output voltage U (ordinate) with respect to air number $\lambda$ (abscissa) of an exhaust composition sensing element;

FIG. 6 is a schematic circuit diagram of a control amplifier;

FIG. 7 is a schematic circuit diagram of a transistorized switching system;

FIG. 8 is a schematic diagram of a temperature sensitive switch; and

Figure 9:
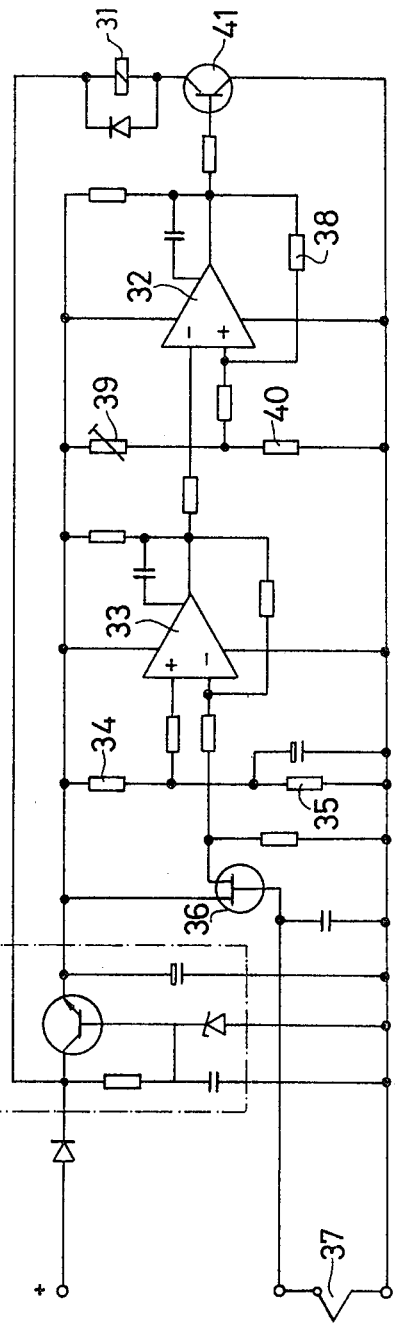

FIG. 9 is another embodiment of a temperature sensing switch.

Figure 1:
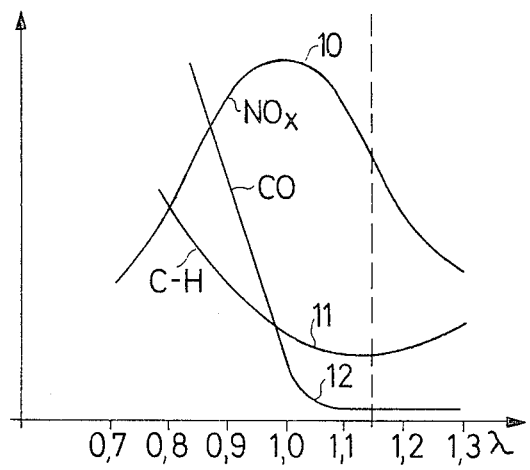
FIG. 1 is a graph of $\lambda$ vs. exhaust emission of various components in the exhaust gases of the engine, as they arise within the exhaust manifold of the engine.

FIG. 1 illustrates the composition of exhaust gases from an internal combustion engine 1 (FIG. 4). Curves 10, 11, 12 illustrate the relationship of the $NO_x$, unburned hydrocarbons, and CO components, respectively, with respect to air number $\lambda$ in an ordinary internal combustion engine. As is clearly seen, there is no single air number $\lambda$ at which all three noxious exhaust components have a minimum value. It is possible, however, to regulate the fuel-air mixture to a value of $\lambda$ which is just below and close to 1.0, at which point both carbon monoxide content and the relative proportion of unburned hydrocarbons is rather low. Unfortunately, the nitrogen-oxygen compounds will be high at this air number. When an operating catalytic reactor is placed in the exhaust system of the engine, emission of $NO_x$ components from the exhaust system can be largely eliminated.

Figure 2:
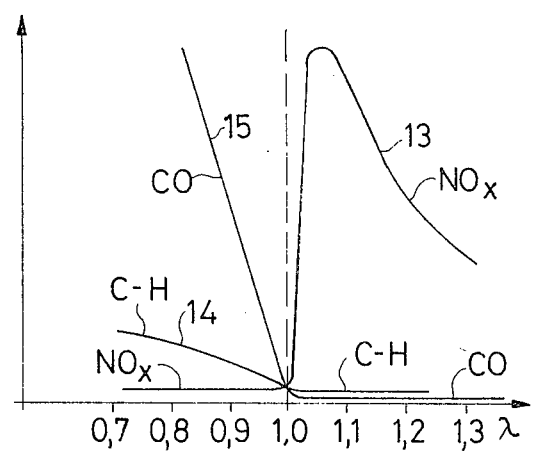
FIG. 2 is a diagram similar to FIG. 1 of the exhaust gases after they have passed through a catalytic reactor.

FIG. 2 illustrates the relationship of nitrogen-oxygen compounds, unburned hydrocarbons, and carbon monoxide at curves 13, 14, 15, respectively, after the gases have passed through reactors, including a catalytic reactor, connected in the exhaust system of the engine. As can be clearly seen, at an air number $\lambda$ which is just under one, all three curves 13, 14, 15 are at very low values.

During the warm-up period of the engine, and when the catalytic reactor is not effective, the exhaust system composition will vary as illustrated in FIG. 1. Thus, to reduce the three noxious components in the exhaust to a tolerable level, it has been found desirable to arrange the fuel-air mixture introduced to the engine such that the mixture is on the lean side, for example at an air number of $\lambda = 1.15$, as indicated by the dashed line in FIG. 1, and to change over to control of the air number $\lambda$ based on sensed composition of the exhaust gases only after the catalytic reactor is effective, that is, has reached its operating temperature. During warm-up, then, control will be with respect to minimum CO and CH emission since the catalytic reactor is not effective to eliminate $NO_x$ compounds; this results, for the warm-up time period, in least overall noxious exhaust emission.

Figure 3:
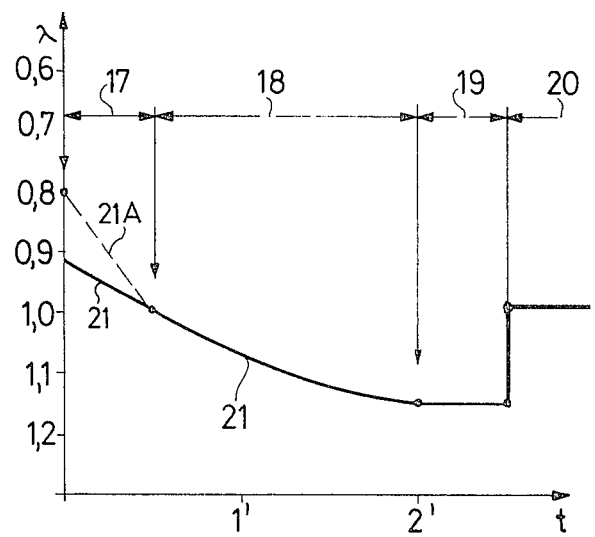
FIG. 3 is a diagram of the change of air number $\lambda$ with respect to time, after starting of the engine.

Curve 21 of FIG. 3 illustrates the variation of air number $\lambda$ with respect to time after starting of a cold engine. The time can be sub-divided in various time periods. The first time period 17, which may be termed the cold starting period, lasts for about 20 to 30 seconds. During this time, the air-fuel mixture is substantially enriched. U.S. Pat. No. 3,734,067, assigned to the assignee of this application, explains time-dependent enrichment of the fuel-air mixture during starting in detail. After termination of the first period 17, the warm-up period 18 begins which extends to about 2 minutes after starting. During this warm-up time period 18, the composition of the air-fuel mixture is based on engine temperature, or cooling water temperature, temperature in the cylinder head, or the like. As seen in FIG. 3, the composition, including degree of enrichment (if any) of the air-fuel mixture is continuously regulated in accordance with temperature as sensed, and at a certain predetermined temperature it will have a fixed value. At this point, the mass ratio of fuel and air will become constant or fixed. This third phase, phase 19, may then be termed the warmed phase or operating phase of the internal combustion engine itself. In the subsequent period, phase 20, the exhaust system of the internal combustion engine has reached a temperature such that catalytic reactors in the exhaust system of the internal combustion engine will also have reached their operating temperature. After period 19, then, and during subsequent operation of the engine, the proportion of fuel and air applied to the engine will be controlled by the composition of the exhaust gases, as explained in cross-referenced U.S. Pat. No. 3,874,171.

When phase 20 is reached, that is, when the catalytic reactor has reached its operating temperature, the temperature sensing element provides a signal to control circuit 4 (see U.S. Pat. No. 3,874,171) which energizes or activates the control system to control the air number $\lambda$ to have the value of about one or just therebelow, so that the engine will operate at a minimum of emission of noxious gases from the exhaust, as illustrated in FIG. 2.

Control of the enrichment just after starting can be effected electronically by means of an electronic controller regulating the amount of fuel applied to the internal combustion engine. A controller for fuel injection to control the amount of fuel after starting is described, for example, in U.S. Pat. No. 3,566,846.

Referring now to FIG. 4: An internal combustion engine 1, for purposes of illustration shown as a four-cylinder engine, takes in air for combustion over an air filter 12' to an inlet duct 13'. A throttle 15' is located within the inlet duct, the throttle position being changeable under control of the accelerator pedal. An air sensor 14, sensing the quantity of air passing through inlet duct 13, is located ahead of throttle 15. Air quantity sensor 14 may be a defectable disk, which provides an electrical output depending on disk deflection against a spring, or the like, in accordance with air flow through duct 13. The cylinders, or selected cylinders of the internal combustion engine, have fuel injection valves 16' associated therewith, only one of which is shown in the drawing. Fuel is supplied to the injection valve 16' over a fuel inlet line 17'.

An exhaust manifold 18' is connected to the exhaust valves of the engine. The exhaust manifold 18' terminates in a thermo reactor 19'. The thermo reactor 19', forming an after-burner, has its output connected to a catalytic reactor 5, which leads to an exhaust pipe 21', to which a muffler can be connected, as well known in the art.

An oxygen sensor 22' is located in the wall of the duct leading from the thermo reactor 19' to the catalytic reactor 5. The output of the oxygen sensor 22' is connected to an air-fuel composition control unit 4, which includes a control amplifier 24' and a transistorized switching circuit 25', controlling the opening time of fuel injection valve 17', in accordance with operating parameters of the engine. The shaft of engine 1 is connected to a pulse source 23' which provides control pulses in synchronism with rotation of the crankshaft of the engine, connected to the switching circuit 25'.

Switching circuit 25' provides pulses which determine the duration of the of the opening period of the fuel injection valve 16 (see cross-referenced U.S. Pat. No. 3,483,851, assigned to the assignee of the present application). The pulse duration is influenced by the amount of air passing to the engine, that is, by the output signal from air sensor 14, as well as by the output of control amplifier 24', applied to inputs B and A of the switching circuit 25', respectively. The injection valve 16' is operated by means of a magnet winding, connected to the output of circuit 25'.

As best seen by the relationship of curve 30' of FIG. 5, the output voltage from sensor 22' jumps at the vicinity of λ = 1.0. This substantial dependence of the output voltage on the air number is used to control the control amplifier 24' of unit 4.

The lambda-control unit 24' and the controller 25' which actually controls the amount of fuel with respect to air flow, that is, the mass ratio of fuel and air, are connected over contacts K of a relay 31. Opening and closing of relay 31 is controlled from a threshold switch 7 which, in turn, is controlled from a temperature sensor 37, or 24, respectively, in dependence on reactor or engine temperature.

The fuel-air mass ratio (λ) can further be controlled in dependence on engine operating conditions as schematically indicated by arrow C. A typical condition would be that the engine is being started, or has just started. Parameter C may, therefore, comprise a switch controlled by the starting switch of the engine, a timer, which is set for a time period corresponding to time 17 (FIG. 3), or a variable time, depending on certain engine temperatures derived, for example, from an engine temperature sensor 24.

The circuit of the control amplifier 24' is illustrated in FIG. 6. A first operational amplifier 40' amplifies the output signals of the oxygen sensor 22'. Its output, appearing at junction 80, is connected to a second operational amplifier 47', connected as an integral controller. The oxygen sensor 22' is connected to an input resistance 41' and then to the inverting input of operational amplifier 40'; the other terminal of sensor 22' is grounded, or connected to chassis. The direct input of the operational amplifier 40' is connected over an input terminal 42' to the tap point of a voltage divider formed of resistors 38', 39'. A feedback resistance 44' is connected between output junction 80' and the inverting input terminal of operational amplifier 40', the value of feedback resistance 44' determining the amplification factor. A resistance 43' connects junction 80 to the positive bus 52' of the supply.

The output junction 80 of operational amplifier 40' is connected over an input resistance 48' to the inverting input of operational amplifier 47'. The direct input of operational amplifier 47' is connected over a resistance 49' to the tap point of a voltage divider formed of resistors 45', 46'. Additionally, the tap point is connected to a controllable resistance 53' and then to an input terminal 54'. The operational amplifier 47' has a capacitor 50' in its feedback path, and is connected with a resistance 51' to positive bus 52'. The capacitor 50' acts as an integrating capacitor. The output terminal of operational amplifier 47' forms terminal A.

The transistorized switching circuit 25' is shown in highly simplified form in FIG. 7. An input stage 55' which, in the present example, is a monostable multivibrator, changes state in synchronism with engine rotation, as schematically shown by switch 23' providing pulses under control of a cam. Switch 23' closes in synchronism with rotation of the crankshaft, so that each fuel injection valve 16' will have an injection pulse applied thereto at each second full rotation of the crankshaft (assuming a four-cycle engine). Correction input B controls the unstable pulse duration of the monostable stage 55' in dependence on air mass being applied to the engine, that is, in the present example if greater airflow is measured, more fuel is to be injected, so that the air number can be held constant.

The output of monostable trigger stage 55' is connected to a pulse extending stage which includes a storage capacitor 60'. The capacitor 60' has one of its electrodes connected to the collector of a transistor 58'. The emitter of transistor 58' is connected over resistance 59' to positive bus 52'. The base of transistor 58' is connected to the output of the monostable trigger stage 55' and, further, to the input terminal A' which is connected with the output terminal A of the circuit of FIG. 4 through the contacts K of a relay 31. A base resistance 57' connects to chassis.

The second terminal of the storage capacitor 60 is connected to the collector of a discharge transistor 61, which has its base connected to the tap point of a voltage divider formed of resistors 62 and 63. Resistor 63 is a temperature sensitive, variable resistor, e.g. an NTC resistor and is shown in FIG. 4 at 24. The emitter of the discharge transistor 61 is connected over resistor 64 to positive bus 52'. A diode 65 is connected between the other terminal of capacitor 60, the collector of transistor 61, and the base of an inverter transistor 67, the diode being so poled that the collector current of the discharge transistor 61 is passed thereby. The base of inverter transistor 67 is connected to ground over resistor 66, and its collector over resistor 68 to positive supply bus 52'.

A resistor 63' is connectable in parallel to resistor 63 by a switch 104 to modify the voltage division ratio of the voltage divider. Signals representative of other input parameters can be connected to the base of transistor 61.

The output of monostable trigger stage 55', as well as the collector of inverter transistor 67 is connected, each, with one of the two inputs of an OR-gate 56', which has its output connected to a switching amplifier 69. Switching amplifier 69 controls a solenoid winding 70 which, in turn, controls the injection valve 16'.

Operation (with reference to FIGS. 5–7): Basically, the operation of the circuit of FIG. 5 is similar to that described in the cross-referenced U.S. Pat. No. 3,483,851 and will be referred to only briefly. The duration of the output pulses of the monostable multivibrator 55' depends on the quantity of air being passed to the input manifold, as above referred to. The output pulse of the monostable stage 55' is applied directly to the switching amplifier 69 over the OR-gate 56'. The pulse from stage 55' is followed by an extension pulse derived from the stage formed by transistors 58' and 61. The duration of the extension pulse is proportional to the duration of the output pulses of the monostable stage 55' and, further, can be influenced by other operating parameters of the engine. Thus, the duration of the extension pulse is influenced by the valve of the resistance of resistor 63; this resistor, for example, a negative temperature coefficient resistor, is used to measure engine temperature, and influences the overall duration of the pulse in accordance therewith. The duration of the extension pulse can additionally be influenced by the voltage applied to input A'. Voltage applied to this input A' influences the charge current to the capacitor 60, applied over transistor 58', during the pulse duration of the monostable stage 55'. This, then, influences the amplitude of the jump in voltage which is transferred at the end of the output pulse of the monostable stage 55' to the capacitor 60. Change in the resistance 63, however, affects the discharge current of capacitor 60 through the resistor 63 and thus the period of time after which the inverter transistor 67 again becomes conductive after it first has been changed to blocked condition.

Further correction voltages can be applied to the base electrodes of the two transistors 58', 61. As an example, the mixture can be made richer during the start-up time of the internal combustion engine and as it warms up by closing switch 104, which corresponds to switch 104 in FIG. 1 of the cross-referenced U.S. Pat. No. 3,483,851. The inverter transistor 67, under quiescent condition, is conductive. Transistor 67 can be blocked when a negative pulse is transferred from capacitor 60. The output signal at the collector of transistor 67, as the output signal of the monostable stage 55', is a ONE signal, that is, it corresponds to the voltage of the positive bus 52'. The OR-gate 56' provides a ONE signal at its output when one of its inputs has a ONE signal thereon. Thus, the output pulse of the pulse extension stage is added, in time, to the output pulse of the monostable trigger stage 55'.

A special operating condition can now be described: Let it be assumed that the output duration of the output pulse of the transistor switching circuit 25' is slightly too low. Too much fuel is injected and the mixture becomes too rich. As seen from FIG. 5, the air number $\lambda$ which is smaller than 1 corresponds to a relatively high output voltage from the sensing element 22'.

The output voltage of the sensor 22' is amplified in operational amplifier 40'.

Since the operational amplifier 40' is connected as an inverter amplifier, the output voltage will have a negative value which is connected over input resistor 48' to the inverting input of the operational amplifier 47'. This operational amplifier is connected as an integrator and thus integrates the negative input voltage in a positive direction. The output potential at terminal A slowly shifts in positive direction. This shift in positive direction of the input voltage at point A' to the circuit of FIG. 7 — assuming relay contacts K are closed — will cause the charge current flowing through transistor 58' for capacitor 60 to decrease. The pulse duration of the pulse extending stage is thus decreased so that the output of the OR-gate will have an overall pulse which is slightly shorter, since the extension pulse, added to that from the trigger stage 55', will be shorter. The solenoid winding 70 is energized for a shorter period of time, less fuel is injected and the air-fuel mixture becomes leaner, until the air number $\lambda = 1.0$. At that point, the output voltage of the oxygen sensor 22' switches to a low value and operational amplifier 47' then integrates in opposite direction to that above described. Integrating in negative direction causes more charge current to flow through transistor 58' to capacitor 60, so that the output pulses of the pulse extending stage increase again in time.

The output voltage of the oxygen sensor 22' thus corrects deviation from the air number $\lambda = 1.0$. By suitable dimensioning of the voltage dividers 38', 39' and 45', 46' (FIG. 6), the air number can be adjusted to a desired value, for example to an air number $\lambda = 0.98$. This is better than controlling the air number to a value of 1.0, exactly, since the catalytic reactor 5 is better able to decompose nitrogen oxides in a slightly reducing atmosphere. At such a value of an air number, that is, $\lambda = 0.98$, approximately, the increase in CO and unburned hydrocarbons is negligible.

The catalytic reactor 5 includes a ceramic catalyst which has active substances, preferably barium chromate and copper chromate. These substances are particularly suitable for catalytic reduction and oxidation reactions, since the chromates change their oxidation stage comparatively easily. Reduction of nitrogen oxide compounds, which are usually present as NO and $NO_2$, is carried out primarily by carbon monoxide and the hydrogen from the unburned hydrocarbons. The ratio of effective mass of $CO/H_2$ is roughly 3 : 1.

The catalytic reactor 5 thus reduces not only the nitrogen oxygen compounds but, in the same process, further reduces the hydrocarbons and the carbon monoxide. The overall noxious substances in the exhaust gas and conducted by exhaust pipe 21' are extremely low.

Practical experiments have shown it to be particularly advantageous to utilize a control amplifier 24' which has an integrating control characteristic, so that remaining deviations from commanded values can be avoided reliably. Such remaining and permanent deviations could occur for example by changes in the sensing output voltage due to aging of the sensor.

The time period 17 (FIG. 3) during which an initial, greater enrichment is carried out can be controlled by a timer 8 operating switch 104 or variably by resistor 63, based on engine temperature. Start enrichment is controlled, for example, in the manner of an automatic choke or by switch 104, and/or resistor 63, which increases enrichment of the air-fuel mixture applied through controller 4 to the internal combustion engine 1 in dependence on engine temperature, as sensed, for example, by the choke thermostat.

One, or both temperature sensors 24, 37 are connected to a threshold switch 7 which controls relay 31. Relay 31 changes over the air-fuel mixture controller 4 from response (1) initially to the parameter C providing start enrichment control (this may also, for example, be a choke); and then (2) to command a progressively leaner mixture, dependent on engine temperature (e.g. as the resistance of resistor 63, FIG. 7, changes); and then (3) to operation in dependence on sensed composition of the exhaust gases, under command of sensor 22', by connecting the contacts K of relay 31.

One embodiment of the threshold switch 7, particularly to be used with a negative temperature coefficient-type sensor, is shown in greater detail in FIG. 8. The sensor is the negative temperature coefficient (NTC) resistor 24 (63 in FIG. 7), which may be located, for example, in a cylinder head of the internal combustion engine or elsewhere, as desired, for example in heat transfer relation to the exhaust system may be used. Resistor 24 is connected with its terminals 25, 26 to a circuit including a resistor 27, a base resistor 28 and a transistor 29 connected between a source of supply and terminal 26. The resistance value of the NTC resistor 24 thus determines the voltage at the junction of resistors 27, 28, which is transferred over a high-impedance input stage to transistor 29. Transistor 29, connected in a directly connected collector circuit operates as an impedance matching or impedance changing element, which is connected to the negative input terminal of an operational amplifier 22. Operational amplifier 22 has its positive input terminal connected to its output at junction 22A by a feedback resistor 23. Feedback resistor 23 thus controls the operational amplifier 22 to act like a Schmitt trigger, to change state when a predetermined threshold value is applied to its input. This predetermined threshold value is determined by comparison of the input applied from transistor 29 with the voltage level determined by the voltage divider formed by resistors 54, 55, which is coupled over a coupling resistor 56, connected to the tap or junction point 50 on the one hand, and to the positive input terminal of operational amplifier 22 on the other. At a predetermined temperature level, that is, at a certain voltage level at the junction of input resistors 27, 28, the operational amplifier will become conductive and will control a transistor 30 to become conductive, thus energizing a relay 31 to effect switching on, or switching off operations so that the circuit will act as a threshold switch. Relay 31 controls the command values which affect controller 4 and causes change-over of control of the air-fuel ratio to the internal combustion engine first from the parameter C, e.g. a timer, then from the automatic fuel-air ratio control of controller 25' and then from an air-fuel mixture control system under control of exhaust gas composition. Relay 31 can also control other electronic, or electromechanical elements. If the temperature should drop, and thus the NTC resistor 24 should change, the relay will not drop out immediately but will have a certain amount of hysteresis before it will be de-energized, thus also delay de-energizing of the air-fuel mixture controller 4 operating in accordance with the relationships indicated in FIG. 2. The threshold level of the operational amplifier 22, and the degree of hysteresis can readily be adjusted by setting of the voltage division ratio of resistors 54, 55 and the feedback resistor 23.

FIG. 9 illustrates another embodiment of the threshold switch 7, in which the sensor is a thermocouple which provides a certain voltage when a certain temperature is reached; a thermocouple 37 is, for example, located in heat transfer relation to catalytic reactor 5. The voltage supplied by thermocouple 37 is utilized to control a field effect transistor 36, operating as an impedance matching element, which has its output connected, in turn, to the negative input of an operational amplifier 33. The positive input of operational amplifier 33 is connected to the tap point of a voltage divider formed of resistors 34, 35, providing a constant reference voltage. The output of operational amplifier 33 is connected to the negative input of an operational amplifier 32, the positive input of which has a reference voltage applied thereto, derived from the tap point of a voltage divider formed of resistors 39, 40. The voltage from thermocouple 37 is transferred over FET 36 to the operational amplifier 33 where it is amplified and applied to the input of the operational amplifier 32. The feedback resistor 38 connected between the output of operational amplifier 32 and the positive input thereof causes operational amplifier 32 to operate as a Schmitt trigger, comparing the voltage at its negative input with the reference voltage determined by resistors 39, 40. When the input voltage at the negative terminal of operational amplifier 32 has a predetermined value, an output signal is obtained which controls amplifying transistor 41 to become conductive, transistor 41 energizing relay winding 31. Energization of relay winding 31, therefore, then can control the fuel-air mixture in accordance with sensed exhaust when the catalytic reactor has reached a predetermined operating temperature.

If the system of the present invention is used in automotive vehicles, and particularly is to be supplied from self-contained electrical systems having widely varying voltages, then a voltage stabilization circuit schematically indicated at 43 is preferably inserted in series with the power supply to the active electronic elements, that is primarily the power supply to the operation amplifiers and the field effect transistor.

The temperature sensing systems utilized in the present invention can be employed to provide temperature sensing signals at different temperature levels, or for different effects. Thus, junction 22A forming the output of the operational amplifier 22 (FIG. 8) can be connected to an input of further operational amplifiers, schematically indicated at 52, or to other operational amplifiers (not shown) to control other switching functions. Further, additional operational amplifiers connected similarly to operational amplifier 22 can be connected in parallel thereto, with different reference voltages being applied to the positive inputs thereof, for example by different settings of the voltage dividers supplying the reference voltage from the tap point of the voltage divider, as more specifically shown, for example, in cross-referenced U.S. Pat. No. 3,851,469.

It has previously been proposed to operate motor vehicles in accordance with the characteristic curve 21 (FIG. 3), with respect to time, after starting of the engine. In other words, initially the fuel is enriched, and then made progressively leaner. This can be obtained, for example, by an automatic choke, and normally setting a carburetor, for example, for an air number corresponding to the value during period 19, FIG. 3. By use of electronic fuel injection controls, which can be accurately matched to engine performance under all conditions (see cross-referenced Patent 3,483,851) it is possible to obtain the performance characteristics of curve 21, for example. The characteristics corresponding to curve 21A can be obtained by additionally modifying the temperature-performance characteristic or the period of time 17, that is, upon starting or immediately thereafter, by closing switch 104. This then introduces the operation or performance parameter C into the control system.

In accordance with the invention, therefore, enrichment of the fuel-air mixture upon starting is continuously changed and decreased so that, only when the operating temperature of the exhaust system of the engine 1 is reached, the composition of the fuel-air mixture applied to the engine can be controlled based on exhaust emission. If the exhaust emission controller 22', 24' were connected even if the reactor is not operative, the maximum of $NO_x$ components would be emitted from the exhaust, with a considerable portion of CO and CH components also being present (see FIG. 1). When the reactor 5 has reached its operating temperature, however, then control of the composition of the mixture applied to the engine ($\lambda$ — control) will result in minimum exhaust emission, as set forth in cross-referenced U.S. Pat. No. 3,874,171.

Various changes and modifications may be made within the scope of the inventive concept.

We claim:

1. Method to reduce noxious components in the exhaust emission of an internal combustion engine system having an exhaust composition sensing means (22') and a reactor (5) in the exhaust system of the internal combustion engine system during the warm-up period of the engine and of the reactor and thereafter when temperature equilibrium has been reached and wherein the engine system comprises a fuel-air mixture control device (4), comprising the steps of enriching the air-fuel mixture supplied by the fuel-air mixture control device (4) immediately after starting of the engine;

deriving a reactor temperature signal representative of temperature of the reactor (5);

disabling control of the fuel-air mixture control device by said exhaust composition sensing means (22') when the sensed temperataure is below a predetermined temperature;

controlling the fuel-air mixture control device (4) to feed a leaner mixture of fuel and air to the engine by reducing the enrichment of the mixture after starting until the engine system has warmed up and the sensed temperature has reached said predetermined temperature level as determined by sensing a characteristic of the reactor temperature signal;

and activating control of said exhaust composition sensing means (22') for said fuel-air mixture control device (4) to control the air number of the air-fuel mixture to about unity when a temperature at or above said predetermined temperature has been sensed.

2. Method according to claim 1, wherein the step of deriving the reactor temperature signal comprises sensing the temperature of the reactor (5).

3. Method according to claim 1, wherein the step of controlling the fuel-air mixture control device to feed a leaner mixture comprises controlling said device to feed a progressively leaner mixture as the characteristic of the reactor temperature signal changes indicative of increasing temperature and until said predetermined temperature has been reached.

4. Method according to claim 1, wherein the engine system comprises an exhaust composition sensing means, wherein the step of controlling the air mixture control device (4) after said predetermined temperature has been reached comprises controlling said air mixture control device under control of said exhaust composition sensing means to feed a mixture which results in minimum noxious exhaust emission.

5. In an internal combustion engine system having an internal combustion engine component (1) and an exhaust component (5, 6) therefor including a reactor (5);

means (4) controlling the relative composition of air and fuel of the air-fuel mixture and applying the mixture to the internal combustion engine;

means (22', 24') to proportion said mixture to just under stoichiometric value;

means (63, 104) connected to and controlling the composition control means (4) to adjust the composition of the air-fuel mixture to a predetermined level in dependence on engine operation conditions (C);

temperature sensing means (24, 37) located in heat transfer relation to a component (1, 5) of the engine system, said temperature sensing means providing a temperature output signal when the temperature of said component passes a predetermined level;

said composition control means (4) being connected to and controlled by said adjustment control means (63, 104) to control the composition of the air-fuel mixture to a first, high enrichment level upon starting and then to a second and leaner level before said temperature output signal is received;

and switching means (31) responsive to said temperature output signal (9) after said temperature output signal has been received transferring control of the composition of the mixture to said mixture composition proportioning means (22', 24') to provide a mixture of just under stoichiometric proportion and to provide to the engine, upon first starting, enrichment at a high level, and then to control the mixture to a leaner mixture during the warm-up phase of the engine, and thereafter to control the air-fuel ratio of the air-fuel mixture applied to the engine as determined by the setting of said mixture composition proportioning means (22', 24').

6. System according to claim 5, wherein the temperature sensing means (37) is located in heat transfer relation to the reactor (5).

7. System according to claim 5, wherein the engine system comprises
a fuel injection system;
and said adjustment control means (63, 104) to control the air-fuel ratio is part of said fuel injection system.

8. System according to claim 5, wherein the mixture proportioning means comprises means (22') sensing composition of the exhaust gases and controlling the air-fuel ratio in accordance with sensed exhaust gas composition.

9. System according to claim 7, wherein the temperature sensing means (24, 37) comprises an electronic threshold switch (7).

10. System according to claim 9, wherein the electronic threshold switch (7) comprises
an operational amplifier (22, 32) connected to function as a Schmitt trigger and providing a switching signal to the switching means (31) to control the air-fuel ratio control means (4);
the temperature sensing means (24, 37) comprises a temperature-electrical transducer;
and means (29, 36) interconnecting said transducer (24, 37) and said operational amplifier (22, 32), including impedance matching means.

11. System according to claim 10, wherein the temperature sensing transducer comprises a negative temperature coefficient (NTC) resistor (24).

12. System according to claim 10, wherein the temperature sensing transducer comprises an NTC resistor (24) located in the cylinder head of the internal combustion engine (1) and provides an output signal representative of temperature in the exhaust component of the engine.

13. System according to claim 10, wherein the temperature sensing transducer comprises a thermo element (37) located in heat transfer relation to the reactor (5) providing an output signal representative of temperature in the reactor.

14. System according to claim 10, wherein the operational amplifier (22, 32) has a plurality of outputs adapted to be connected to further operational amplifiers to provide a plurality of threshold output signals.

15. System according to claim 9, wherein the temperature sensing transducer comprises a thermo element (37) and wherein the threshold switch (7) comprises a high impedance input stage (36) connected to the thermo element (37);
an operational amplifier (33) having one input connected to a reference voltage and another input connected to the output of the high impedance input stage (36);

and a trigger-connected operational amplifier (32) having the output of the first operational amplifier (33) applied thereto.

16. System according to claim 9, further comprising amplifier means (30, 41) connected to the output of the threshold switch (7) and providing an operating signal for the air-fuel ratio control means to control the air number (λ) of the air-fuel mixture applied to the engine.

17. System according to claim 5, wherein the adjustment control means (63, 104) comprises a timer switch (104) initiating a timing interval having a duration of up to about 30 seconds.

18. System according to claim 5, wherein said adjustment control means (63) controls the composition of the air-fuel mixture to be progressively leaner and into the lean range.

19. System according to claim 5, wherein said adjustment control means (63, 104) comprises temperature sensitive means (63) in temperature sensing relation to the engine and controlling the composition of the air-fuel mixture to be progressively leaner, after starting, and into the lean range as the temperature of the engine rises.

* * * * *